United States Patent
Shao

(10) Patent No.: US 8,534,972 B2
(45) Date of Patent: Sep. 17, 2013

(54) WATERPROOF SCREW BOLT AND A WATERPROOF SCREW BOLT COMBINATION

(75) Inventor: Chun-Hao Shao, Tu-Cheng (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 266 days.

(21) Appl. No.: 13/089,224

(22) Filed: Apr. 18, 2011

(65) Prior Publication Data

US 2012/0195710 A1  Aug. 2, 2012

(30) Foreign Application Priority Data

Jan. 28, 2011  (CN) .......................... 2011 2 0030889

(51) Int. Cl.
  *F16B 1/00*  (2006.01)
(52) U.S. Cl.
  USPC ............................ 411/82.1; 411/82; 411/82.3
(58) Field of Classification Search
  USPC .......................................... 411/82, 82.1, 82.3
  See application file for complete search history.

(56) References Cited

U.S. PATENT DOCUMENTS

| | | | | |
|---|---|---|---|---|
| 2,550,357 | A | * | 4/1951 | Jansen et al. .................. 411/399 |
| 3,399,589 | A | * | 9/1968 | Breed ............................ 411/428 |
| 4,701,088 | A | * | 10/1987 | Crull ............................. 411/369 |
| 4,733,872 | A | * | 3/1988 | Sugimura ........................ 411/82 |
| 4,932,805 | A | * | 6/1990 | Mullen et al. .................. 403/13 |
| 4,945,625 | A | * | 8/1990 | Winston ....................... 29/524.1 |
| 5,188,495 | A | * | 2/1993 | Jones, Jr. ...................... 411/369 |
| 5,407,312 | A | * | 4/1995 | Terrizzi ......................... 411/304 |
| 6,244,807 | B1 | * | 6/2001 | Garcia .......................... 411/369 |
| 6,764,262 | B1 | * | 7/2004 | Hargis ........................ 411/371.1 |
| 2003/0035696 | A1 | * | 2/2003 | Ducker et al. ............... 411/82.1 |
| 2003/0035697 | A1 | * | 2/2003 | Kubler et al. ................ 411/82.1 |

* cited by examiner

*Primary Examiner* — Roberta Delisle
(74) *Attorney, Agent, or Firm* — Altis Law Group, Inc.

(57) ABSTRACT

A waterproof screw bolt comprising: a head having a bottom surface; and a threaded shank extending from the bottom surface, the threaded shank defining a first ring-shaped groove in the bottom surface around the threaded shank, the head defining a through hole, the through hole running through the head and being in communication with the first ring-shaped groove, the through hole configured to introduce a glue into the first ring-shaped groove.

8 Claims, 4 Drawing Sheets

WATERPROOF SCREW BOLT AND A WATERPROOF SCREW BOLT COMBINATION

BACKGROUND

1. Technical Field

The present disclosure relates to a waterproof screw bolt and a waterproof screw bolt combination.

2. Description of Related Art

Screws are often used to join two separate members together through engaging holes defined in each member. In some situations, such as in an outdoor or in a wet environment, water can seep through the engaging holes. A typical method is to add a sealing washer under the head of the screw to prevent the water from seeping through the engaging holes.

However, unexpected deformation and breakage of the sealing washer may occur when the screw is applied.

Therefore, a waterproof screw and a waterproof screw bolt combination, which can overcome the above-mentioned problems, is needed.

DETAILED DESCRIPTION

Figure 1:
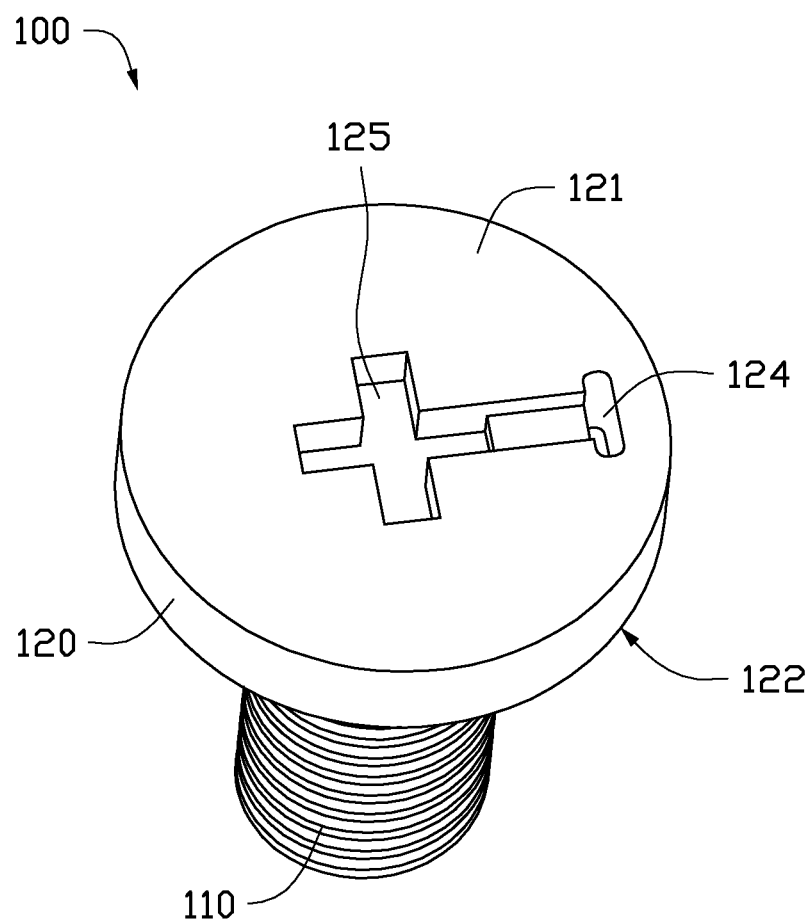
FIG. 1 is a schematic view of a waterproof screw bolt according to an exemplary embodiment.
Figure 2:
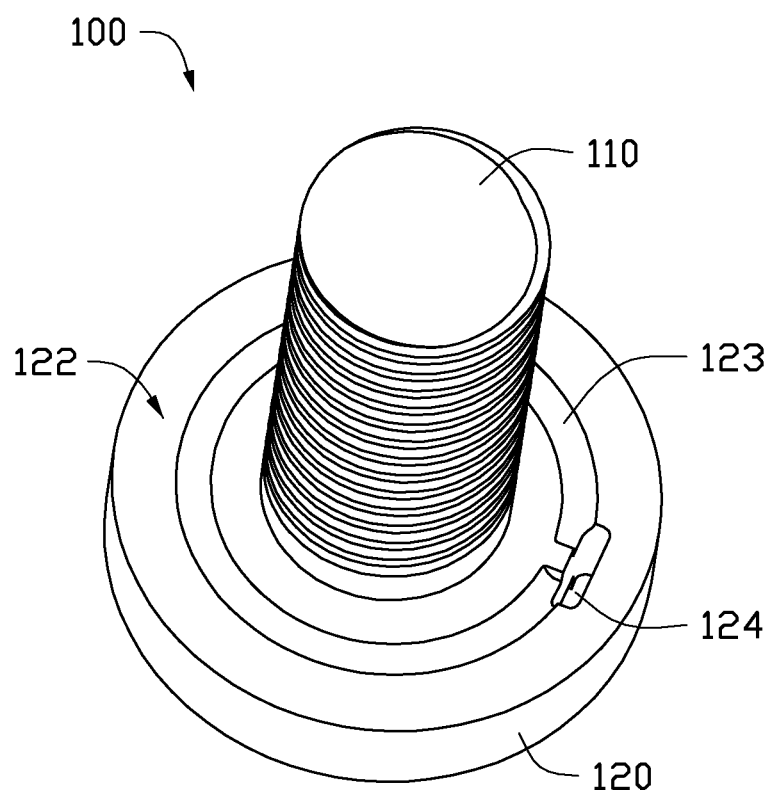
FIG. 2 is similar to FIG. 1, but viewed from another angle.

Referring to FIGS. 1 and 2, a waterproof screw 100, according to an exemplary embodiment, includes a head 120 and a threaded shank 110 extending downwards from the head 120.

The head 120 includes a top surface 121 and a bottom surface 122 opposite to the top surface 121. The threaded shank 110 extends from the bottom surface 122.

The bottom surface 122 defines a first ring-shaped groove 123 around the threaded shank 110. The top surface 121 defines a through hole 124. The through hole 124 runs through the head 120 from the top surface 121 to the bottom surface 122 and is in communication with the first ring-shaped groove 123. The through hole 124 is configured to allow the first ring-shaped groove 123 to be filled with glue.

The top surface 121 further defines a screwdriver slot 125. The screwdriver slot 125 is in communication with the through hole 124. It is to be understood that in alternative embodiments, the head 120 of the waterproof screw 100 may be shaped as hexagonal column instead of defining the screwdriver slot 125 in the top surface 121.

Figure 3:
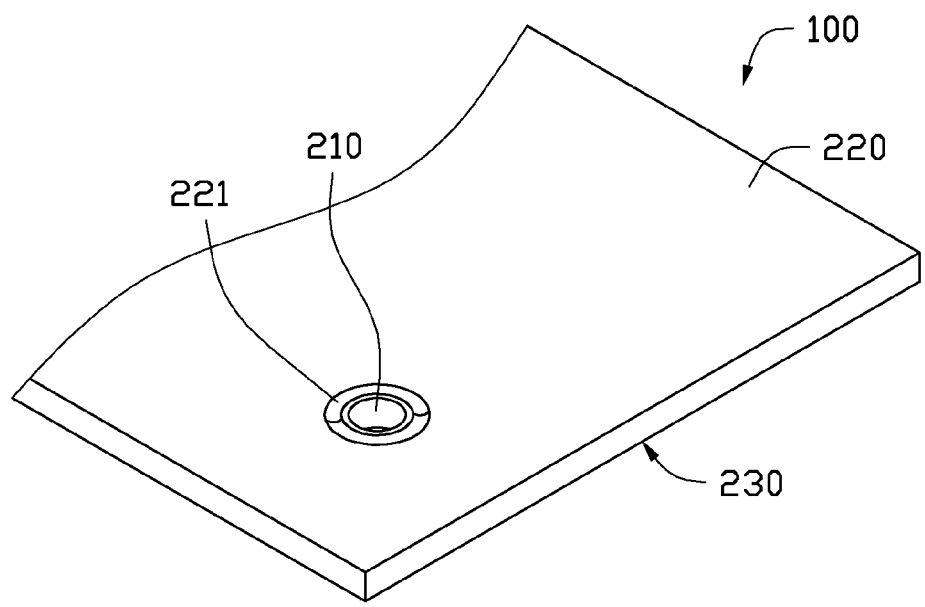
FIG. 3 is a schematic view of a waterproof screw bolt combination.
Figure 4:
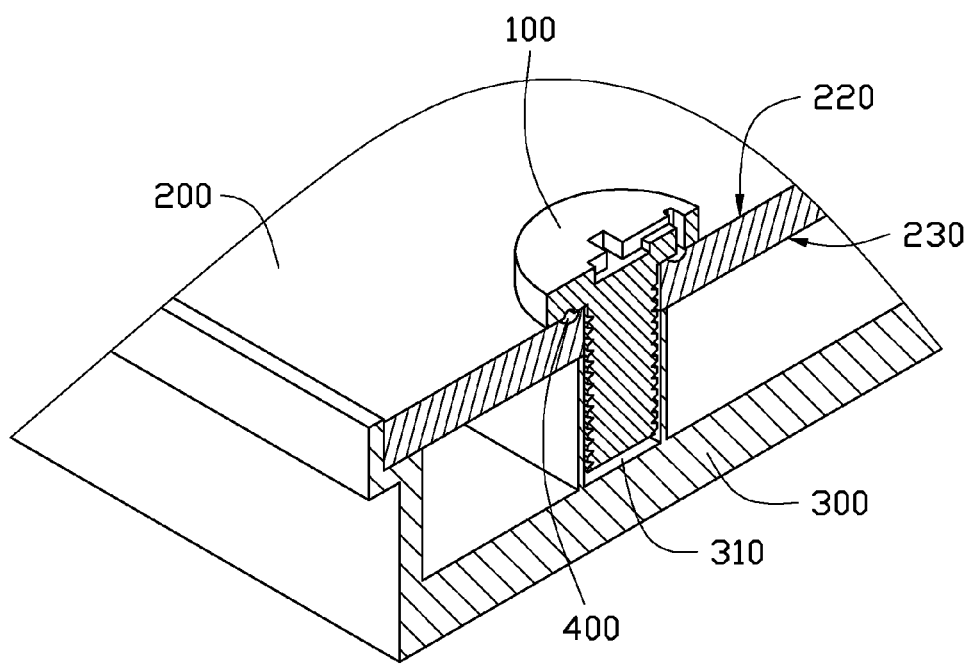
FIG. 4 is a cutaway view of the waterproof screw bolt combination of FIG. 3.

FIGS. 3 and 4 show a combination includes the waterproof screw 100, a first member 200 and a second member 300.

The first member 200 includes a contact surface 220, a matching surface 230, and a first engaging hole 210. The first engaging hole 210 runs through the first member 200 from the contact surface 220 to the matching surface 230. The contact surface 220 is used to contact with the head 120. The matching surface 230 is used to match with the second member 300. The second member 300 defines a second engaging hole 310 corresponding to the first engaging hole 210. The waterproof screw 100 match in the first engaging hole 210 and the second engaging hole 310 to fasten the first member 200 to the second member 300 together.

The assembly method of the combination includes the following steps.

First, a second ring-shaped groove 221 is defined around the first engaging hole 210. The second ring-shape groove 221 corresponds to the first ring-shaped groove 123.

Second, the waterproof screw 100 is assembled into the first engaging hole 210 and the second engaging hole 310 to fasten the first member 200 to the second member 300. At this time, the first ring-shaped groove 123 and the second ring-shaped groove 221 cooperatively define a ring-shaped channel 400 around the first engaging hole 210 between the bottom surface 122 and the contact surface 220. Further, the width of the second ring-shaped groove 221 can be made slightly larger than the width of the first ring-shaped groove 123 to prevent dislocation between the first ring-shaped groove 123 and the second ring-shaped groove 221.

Third, a glue is injected, such as epoxy resin, into the ring-shape channel 400 through the through hole 124.

By the above steps, a sealing ring can be formed around the first engaging hole 210 between the bottom surface 122 and the contact surface 220. Because the sealing ring is formed after the waterproof screw 100 is assembled, no deformation of the sealing ring occurs, a junction portion between the head 120 and the first engaging hole 210 is waterproofed.

Additionally, because of the existence of the sealing ring between the head 120 of the waterproof screw 100 and the contact surface 220 of the first member 200, the waterproof screw 100 can not easily loosen on its own due to vibration.

Furthermore, because the screwdriver slot 125 defined in the head 120 of the waterproof screw 100 is in communication with the through hole 124, to keep others from mistakenly removing the screw 100, the amount of glue injected into the ring-shaped channel 400 can be increased to fill the screwdriver slot 125.

It is to be understood that in alternative embodiments, the steps of defining the second ring-shaped groove 221 around the first engaging hole 210 in the contact surface 220 can be omitted. The first ring-shaped groove 123 and the contact surface 220 of the first member 200 cooperatively define the ring-shaped channel 400.

It is to be understood that, the glue injected into the ring-shaped channel 400 and the screwdriver slot 125 may be further solidified to enhance the sealing effect.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A waterproof screw bolt comprising:
   a head having a bottom surface and a top surface opposite to the bottom surface; and
   a threaded shank extending from the bottom surface, the head defining a first ring-shaped groove in the bottom surface around the threaded shank, the head defining a through hole, the through hole running through the head from the top surface to the bottom surface and being in communication with the first ring-shaped groove, the through hole configured to introduce a glue into the first ring-shaped groove.

2. The waterproof screw of claim 1, wherein the top surface defines a screwdriver slot in communication with the through hole.

3. The waterproof screw of claim 2, wherein a configuration of the screwdriver slot is cross-shaped.

4. A combination comprising:
a first member defining a first engaging hole;
a second member defining a second engaging hole, the second member attached to the first member, the second engaging hole aligned with the first engaging hole;
a waterproof screw bolt including a head having a bottom surface and a top surface opposite to the bottom surface; and a threaded shank extending from the bottom surface, the head defining a first ring-shaped groove in the bottom surface around the threaded shank, the head defining a through hole, the through hole running through the head from the top surface to the bottom surface and being in communication with the first ring-shaped groove, the shank threadedly engaging in the first engaging hole and the second engaging hole, the bottom surface of the head contacting the first member; and
a glue cured in the first ring-shaped groove to form a sealing ring between the bottom surface and the first member.

5. The combination of claim 4, wherein the top surface defines a screwdriver slot in communication with the through hole.

6. The combination of claim 5, wherein a configuration of the screwdriver slot is cross-shaped.

7. A combination comprising:
a first member defining a first engaging hole;
a second member defining a second engaging hole, the second member attached to the first member, the second engaging hole aligned with the first engaging hole;
a waterproof screw bolt including a head having a bottom surface; and a threaded shank extending from the bottom surface, the head defining a first ring-shaped groove in the bottom surface around the threaded shank, the head defining a through hole, the through hole running through the head and being in communication with the first ring-shaped groove, the shank threadedly engaging in the first engaging hole and the second engaging hole, the bottom surface of the head contacting the first member; and
a glue cured in the first ring-shaped groove to form a sealing ring between the bottom surface and the first member,
wherein a second ring-shaped groove is defined around the first engaging hole in the first member, the second ring-shaped groove and the first ring-shaped groove cooperatively defining a ring-shaped channel filled with the cured glue.

8. The combination of claim 7, wherein the width of the second ring-shaped groove is larger than the width of the first ring-shaped groove.

* * * * *